United States Patent [19]
Hartz et al.

[11] 3,776,495
[45] Dec. 4, 1973

[54] MOUNTING DEVICE

[75] Inventors: Marvin E. Hartz, Grosse Pointe Farms; Roman J. Witek, Jr., Gibraltar, both of Mich.

[73] Assignee: Essex International, Inc., Fort Wayne, Ind.

[22] Filed: Nov. 9, 1971

[21] Appl. No.: 196,973

[52] U.S. Cl. ............... 248/71, 24/73 P, 24/208 A, 24/221 L, 85/5 R, 248/73
[51] Int. Cl. ............................................ F16b 15/00
[58] Field of Search ..................... 248/73, 71, 65 24/73 RM, 221 L, 73 P, 73 PF, 73 PM; 85/5 R

[56] References Cited
UNITED STATES PATENTS

| | | | |
|---|---|---|---|
| 3,550,217 | 12/1970 | Collyer | 24/73 PF |
| 3,210,032 | 10/1965 | Slyke | 248/73 |
| 2,931,851 | 4/1960 | Sims | 248/71 |
| 3,485,133 | 12/1969 | Rapata | 85/5 R |

Primary Examiner—Roy D. Frazier
Assistant Examiner—Rodney H. Bonck
Attorney—Learman & McCulloch

[57] ABSTRACT

A device for mounting an article such as a wire or bundle of wires on a support having an opening therein, the mounting device having a body of such size as to pass through the opening and a pair of flexible, substantially triangular flanges extending from opposite sides of the body and together having a length greater than the corresponding dimension of the opening so as to project beyond the latter, the flanges being flexible so as to permit them to pass through the opening. Each flange has two portions, one of which extends substantially normal to the body and the other of which extends substantially normal to the first portion, the two portions merging along a smoothly rounded curve. The body carries means for attaching it to the article to be supported and between the attaching means and the flanges is a deformable cushioning rib which cooperates with the flanges to provide a rattle-free mounting of the mounting device on the support.

15 Claims, 6 Drawing Figures

PATENTED DEC 4 1973 3,776,495

INVENTORS
MARVIN E. HARTZ
ROMAN J. WITEK JR.
BY
*Learman & McCulloch*
ATTORNEYS

MOUNTING DEVICE

The invention disclosed herein relates to a molded plastic device for mounting one or more wires or the like on a support member such as a vehicle body so as to maintain the wires in a predetermined position in which they will be protected against deterioration and wear.

Mounting devices of the general class to which this invention relates are in widespread use. Not all of the mounting devices are altogether satisfactory, however, for a number of reasons. For example, most such mounting devices have flexible flanges which may be cammed inwardly to pass through an opening in a support member and which spring outwardly following passage through the opening so as to overlie the edge of the opening. Some of these devices include a single pair of flanges which are so shaped as to permit molding of the device in a two-part, separable mold, but in many instances the surface area of the retaining flanges is insufficient to withstand vibrations and the like to which the devices are subjected, thereby resulting in premature failure of the devices. This problem has been overcome to some extent by other mounting devices having more than two retaining flanges. In the molding of mounting devices of this kind, however, separable molds of three or more parts have been required, thereby greatly increasing the investment which must be made to produce the mounting devices.

In addition to the foregoing, most of the molded mounting devices currently in use are formed of a plastic material which is relatively hard and rigid. Unless considerable care is exercised in the fitting of such devices into the mounting openings of the support structure, objectionable rattles and other noises may result.

An object of this invention is to provide a molded mounting device for wires or the like having a pair of retaining flanges so constructed as to permit the economies of two-part molds to be realized, and in which the flanges nevertheless provide adequate strength to perform the mounting function.

Another object of this invention is to provide a mounting device of the character described which can be molded either directly to the article to be supported or provided with attaching means adapted for subsequent connection to the article to be supported.

A further object of the invention is to provide a mounting device having two retaining flanges which cooperate to assure rattle-free mounting of the device on the supporting means.

Other objects and advantages of the invention will be pointed out specifically or will become apparent from the following description when it is considered in conjunction with the appended claims and the accompanying drawings, in which:

Figure 1:
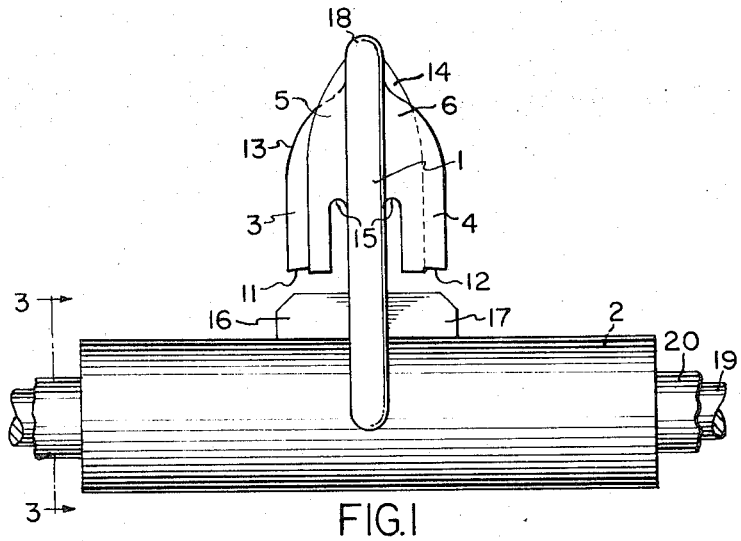
FIG. 1 is a side elevational view of a mounting device constructed in accordance with one embodiment of the invention.
Figure 3:
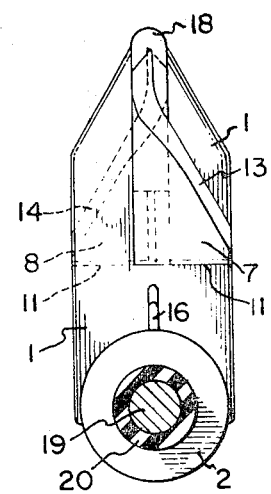
FIG. 3 is a sectional view taken on the line 3—3 of FIG. 1.
Figure 2:
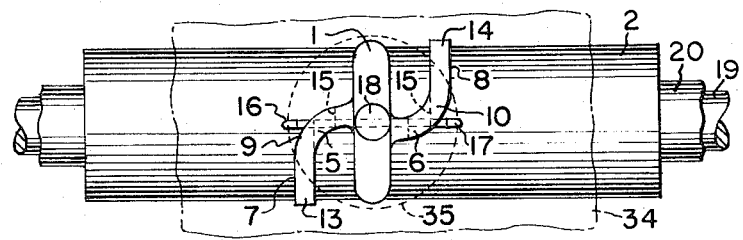
FIG. 2 is a top plan view of the apparatus shown in FIG. 1 and illustrating in phantom lines a supporting member with which the mounting device may be assembled.

A mounting device constructed in accordance with the embodiment of the invention disclosed in FIGS. 1 - 3 may be molded from a suitable plastic material, such as polypropylene, and comprises a generally flat, elongate body 1 secured at one end to and upstanding from an attaching sleeve 2. The opposite end of the body 1 carries a pair of flexible, substantially triangular retaining flanges 3 and 4 which are formed integrally with and extend from opposite sides of the body 1. Each of the flanges 3 and 4 is bent or curved along a line substantially parallel to the longitudinal axis of the body 1 to form a first portion 5 and 6, respectively, which extends substantially normal to and in a direction away from the body 1. The flange 5 includes a second portion 7 which is joined to and extends substantially normal to the portion 5. The flange 4 also has a second portion 8 which is joined to and extends substantially normal to the first portion 6. The respective flange portions merge along smoothly rounded curves 9 and 10. The flanges together present substantially an S-shaped configuration in plan as is best shown in FIG. 2.

The flanges 3 and 4 are spaced from the attaching member 2 and the lower surfaces 11 and 12 of the respective flanges are inclined upwardly and transversely thereof as is best shown in FIG. 1. The upper surfaces 13 and 14 of the respective flanges also are inclined, but in this instance they are inclined downwardly and transversely of the flanges. The lower surfaces of the respective flange portions 5 and 6 are interrupted by slots or notches 15 adjacent the body 1, thereby increasing the flexibility of the flanges.

Extending from opposite sides of the body 1 and formed integrally with the latter and with the attaching member 2 is a pair of thin, deformable ribs 16 and 17 which terminate short of and confront the flanges 3 and 4. The upper end of the body 1 tapers toward its free end and terminates in a smoothly rounded tip 18.

The configuration of the body, the flanges, the cushioning ribs, and the attaching member is such that the entire device may be molded in a two-part mold.

The entire mounting device, including the attaching member 2, may be molded in situ about an article to be mounted on a support. As disclosed, the article comprises a single wire 19 around which is a jacket 20 of insulation, the sleeve 2 embracing the jacket. It should be understood, however, that the single wire 19 could be replaced by a bundle of wires or by any other article to be mounted on a support.

Figure 4:
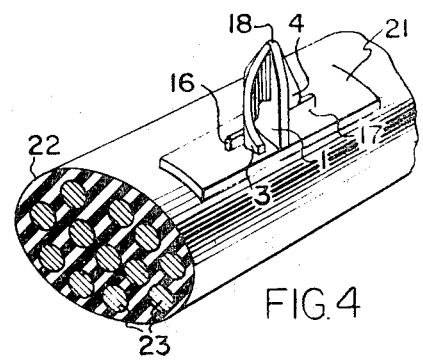
FIG. 4 is an isometric view, on a greatly reduced scale, of another embodiment of the invention.

The mounting device illustrated in FIG. 4 corresponds to the previously described embodiment with the exception that the embodiment shown in FIG. 4 has an attaching member 21 formed in the shape of a flange or foot so as to confront a bundle 22 of wrapped wires 23. The foot 21 is of such length as to extend beyond the flanges 3 and 4 a distance sufficient to permit tape or the like (not shown) to secure the foot to the bundle of wires.

Figure 5:
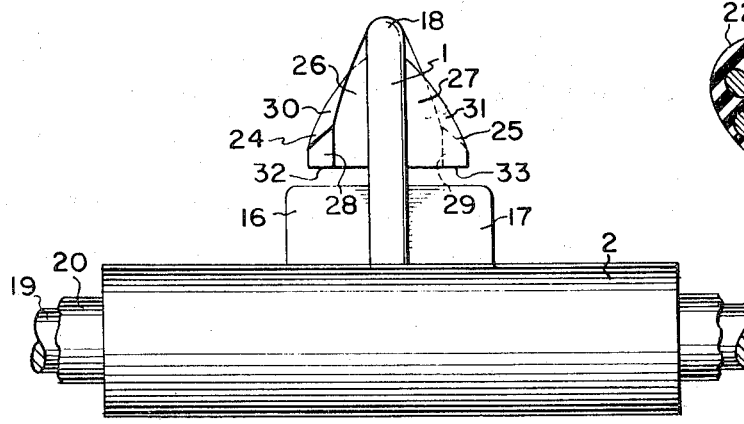
FIG. 5 is a side elevational view of a further embodiment of the invention.
Figure 6:
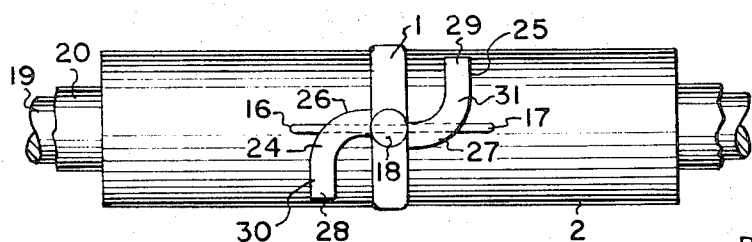
FIG. 6 is a top plan view of the apparatus shown in FIG. 5.

The embodiment of the invention shown in FIGS. 5 and 6 is the same as that disclosed in FIGS. 1 - 3 except for the details of the retaining flanges. In the modified embodiment the body 1 has two substantially triangular flanges 24 and 25 extending from opposite sides of the body. The flanges 24 and 25 have first portions 26 and 27, respectively, which extend substantially normal to the body 1 and second portions 28 and 29, respectively, which extend substantially normal to the associated first portions. The upper surfaces 30 and 31 of the respective flanges are inclined outwardly and downwardly, and the lower surfaces 32 and 33 of the flanges may be horizontal, as shown, or inclined upwardly and radially inwardly, as was described in connection with the earlier embodiment. The lower surfaces 32 and 33 of the flanges are continuous over the entire length of the latter.

Each of the disclosed mounting devices is adapted to be assembled on a metal or other support 34 shown in phantom lines in FIG. 2 and in which is formed an opening 35. The body 1 is of such width as to pass freely through the opening 35, but the combined length of the flanges 3, 4 or 24, 25 is greater than the corresponding dimension of the opening 35.

To assemble the mounting device with the support 34 the free end 18 of the body 1 is presented to the opening 35 and pushed into the latter. The taper of the body will guide the latter as it moves into the opening so as to enable the body to be centered in the opening. As the body continues to be pushed into the opening, the edge of the opening will bear on the inner flange portions 5, 6 or 26, 27 which also assist in centering the device in the opening. The inclined upper surfaces of the flanges will react with the edge of the opening and effect rotation of the flanges counterclockwise, as viewed in FIGS. 2, 4 and 6, thereby causing radially inward movement of the outer flange portions 7, 8 or 28, 29 an amount sufficient to enable them to pass through the opening 33. The inherent resilience of the material from which the flanges are made will enable the flanges to spring radially outwardly after they have passed through the opening 35 so as to overlie the surface of the support member 34 adjacent the opening and secure the mounting device on the support.

The spacing between the ribs 16 and 17 and the confronting surfaces of the flanges preferably is less than the thickness of the support member 34. As a consequence, the ribs 16 and 17 will be deformed or crushed as the mounting device is pushed through the opening a distance sufficient to permit the flanges to overlie the support member. The inherent resilience of the material from which the ribs 16 and 17 are made thus enables the ribs to exert a yieldable cushioning force against the support member 34 so as to maintain the ribs and the flanges snugly against the opposite surfaces of the support and prevent rattling of the mounting device due to looseness.

The inclination of the lower surfaces 11, 12 of the retaining flanges is such that exertion of a force on the mounting device in a direction tending to withdraw it from the opening in the support member exerts a force on the flanges tending to rock them in a direction radially outwardly, or clockwise, as viewed in FIG. 2. Forces tending to withdraw the mounting device from its support, therefore, act on the flanges in such manner as to cause them to resist such withdrawal.

The disclosed embodiments are representative of presently preferred forms of the invention, but are intended to be illustrative rather than definitive of the invention. The invention is defined in the claims.

We claim:

1. A mounting device comprising an elongate body terminating at one end in a nose; attaching means carried by said body at its other end; and a pair of flexible retainer flanges secured to said body between its ends, each of said flanges being substantially triangular with one side extending parallel to and attached to said body and a second side tapering in a direction toward said nose, each of said flanges being bent between its ends along a line substantially parallel to the longitudinal axis of said body to form a first portion extending away from and substantially normal to said body and a second portion extending substantially normal to said first portion.

2. The construction set forth in claim 1 wherein said first portion of each of said flanges has a slot therein adjacent said body.

3. The construction set forth in claim 1 wherein the second portion of each of said flanges has an inclined surface confronting said attaching means.

4. The construction set forth in claim 1 including a deformable member interposed between said attaching means and said retainer flanges.

5. The construction set forth in claim 1 wherein the first portion of each of said flanges has a surface inclined outwardly from said body and toward said attaching means.

6. The construction set forth in claim 5 wherein the second portion of each of said flanges has an inclined surface extending in continuation of the inclined surface of the associated first portion.

7. The construction set forth in claim 1 wherein the first and second portions of said flanges together present a substantially S-shaped configuration in plan.

8. The construction set forth in claim 1 wherein each of said flanges has a surface confronting said attaching means, said surface being continuous throughout the length of its associated flange.

9. The construction set forth in claim 1 wherein said attaching means comprises a tubular member adapted to embrace an article to be supported.

10. The construction set forth in claim 1 wherein said attaching means comprises a foot adapted to seat on an article to be supported.

11. A mounting device comprising an elongate body terminating at one end in a nose; attaching means carried by said body at its other end; and triangular retainer flanges joined to and carried by said body between its ends and extending outwardly of said body from opposite sides thereof, each of said flanges being smoothly curved between its ends along a line substantially parallel to and spaced from the longitudinal axis of said body to form first and second flange portions, each of the second flange portions tapering in a direction toward said nose and having an upper surface inclined outwardly and transversely of said second flange portion.

12. The construction set forth in claim 11 wherein each of said flanges has a second surface confronting and spaced from said attaching means, each of said second surfaces being inclined transversely of its associated flange.

13. The construction set forth in claim 11, wherein the first portions of said flanges adjacent said body are slotted.

14. The construction set forth in claim 13 wherein the second portions of said flanges have second surfaces confronting said attaching means, each of said second surfaces being inclined transversely of its associated flange portion.

15. The construction set forth in claim 11 wherein each of said flanges has a second surface spaced from and confronting said attaching means, and a deformable rib interposed between said attaching means and said flanges and being spaced from the second surfaces thereof.

* * * * *